Dec. 20, 1960 P. R. GILSON 2,965,835

MAGNETIC AMPLIFIER

Filed Jan. 13, 1958

INVENTOR.
PAUL R. GILSON

BY

Christie, Parker & Hale

ATTORNEYS

United States Patent Office 2,965,835

Patented Dec. 20, 1960

2,965,835

MAGNETIC AMPLIFIER

Paul R. Gilson, West Covina, Calif., assignor to Burroughs Corporation, Detroit, Mich., a corporation of Michigan Filed Jan. 13, 1958, Ser. No. 708,707

5 Claims. (Cl. 323—89)

Figure 1:
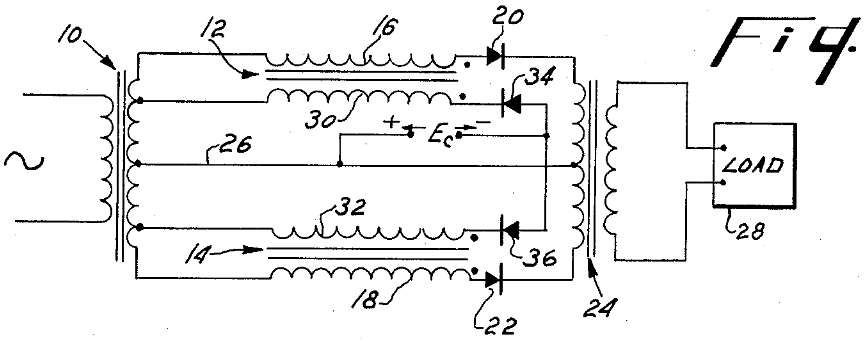

This invention relates to magnetic amplifiers, and more particularly is concerned with a magnetic amplifier in which the phase of the A.C. output signal can be reversed at high speed.

A self-saturating voltage sensitive type of magnetic amplifier having half-cyle response time has been developed known as the Ramey circuit, named after the inventor. In this type of circuit, in its basic form, the load winding of a saturable reactor is connected in series with a diode and the load across an alternating current source. The control winding of the saturable reactor is connected in series with a diode and a source of D.C. control voltage across the alternating current source. The diodes in the load winding and the control winding are arranged so that conduction takes place alternately in the load circuit and control circuit on successive half cycles of the alternating current source. In this way the flux level is set by the control circuit during one half cycle to control the point during the load half cycle at which saturation takes place. This circuit produces a half-wave D.C. voltage across the load.

The circuit can be modified to produce an A.C. voltage across the load by providing a second saturable reactor with its load winding connected in series with a diode, the diode and load winding shunting the diode and load winding of the first reactor. The diodes in the two branches of the load circuit are arranged to conduct on successive half cycles of the source, the control circuit being arranged so that the flux is set in one reactor during the time the other reactor is conducting. Thus the magnetic amplifier can be made to produce an A.C. voltage across the load.

While a circuit of the type described above for producing an A.C. voltage across the load may be turned on in half a cycle, regardless of the load impedance, it cannot in practice be turned off in such a short time. The reason is that circulating currents are set up in the closed loop formed by the two load windings of the reactors and their associated diodes connected in parallel. This effect is even more noticeable when the load is inductive with a relatively low D.C. resistance, such as one winding of a two-phase servo motor. This time lag, of several cycles or more, in the turnoff time of a self-saturating magnetic amplifier connected to produce an A.C. output, is a well known phenomenon and limitation in the operation of the Ramey type circuit.

The present invention provides an improved self-saturating type magnetic amplifier which is capable of turning off or reversing the phase of the A.C. voltage applied across an inductive load in a half cycle of the excitation source. The present circuit arrangement is such as to eliminate any circulating currents through the load windings of the reactors.

In its simplest form, the magnetic amplifier of the present invention comprises a center-tapped input impedance and a center-tapped output impedance, an A.C. excitation voltage being applied across the input impedance, and the load being connected across the output impedance. The center-taps of the input and output impedances are directly connected. Respective ends of the input and output impedances are joined by the load winding of a saturable reactor and diode in series, the two diodes being arranged to conduct current in the same direction in relation to the input impedance whereby no circulating currents through the load windings of the two reactors can exist. Each of the control windings of the saturable reactors is connected in series with a diode to a common terminal, and also respectively connected to the input impedance on either side of the center-tap. The control signal is applied between the common terminal and the center-tap of the input impedance.

Figure 2:
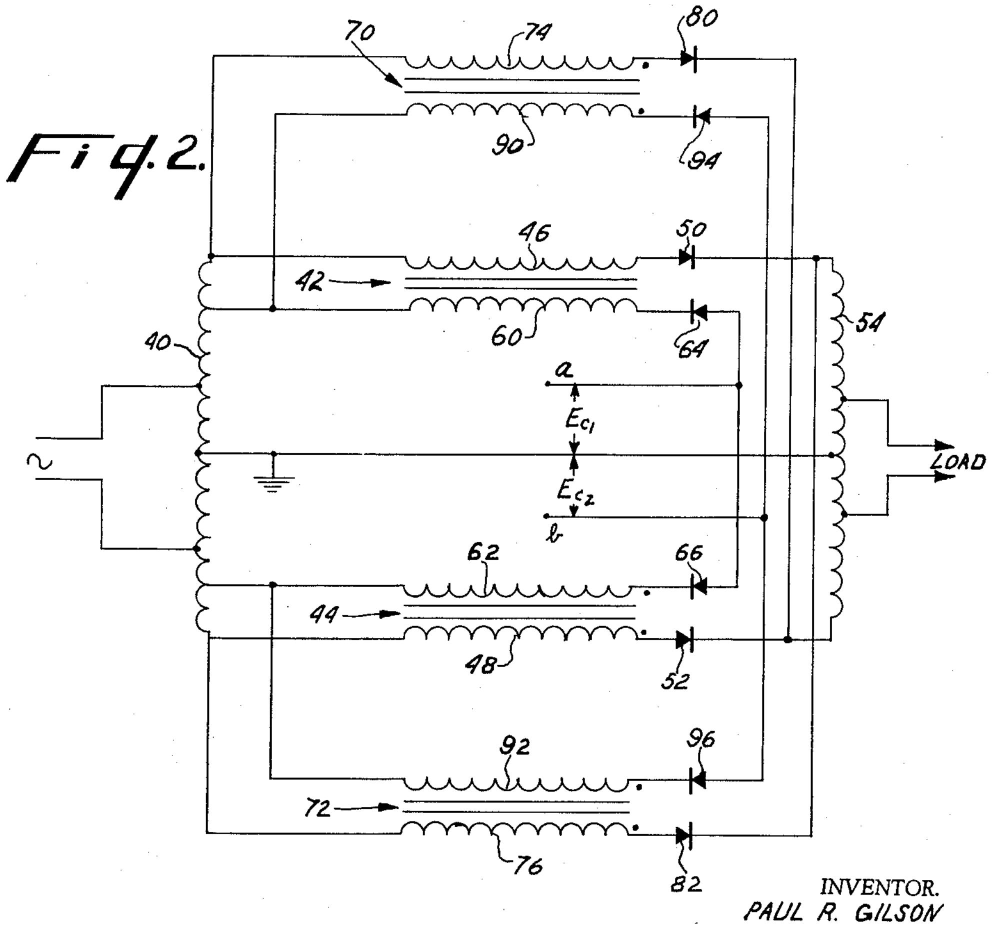

For a more complete understanding of the invention, reference should be had to the accompanying drawings, wherein:

Fig. 1 is a schematic wiring diagram of the magnetic amplifier of the present invention; and Fig. 2 is another embodiment of the present invention, showing a schematic diagram of a magnetic amplifier having a reversible phase A.C. output.

In its basic form, as shown in Fig. 1, the magnetic amplifier circuit of the present invention comprises an input transformer 10 to which an alternating current reference signal is applied across the primary winding. A pair of saturable reactors indicated at 12 and 14 are provided. The saturable reactor 12 includes a load winding 16 which is connected to one end of the secondary winding of the input transformer 10. Similarly a load winding 18 of the saturable reactor 14 is connected to the opposite end of the secondary winding of the input transformer 10.

The load windings 16 and 18 of the saturable reactors 12 and 14 are respectively connected by diodes 20 and 22 to the opposite ends of the primary winding of an output transformer 24. The diodes 20 and 22 are arranged to conduct current in the same direction between the input and output transformers. Thus there is no closed-loop path provided by means of which currents can circulate between the load windings of the two reactors 12 and 14, since one or the other of the diodes 20 and 22 will block the flow of current in either direction in the closed loop formed by the windings of the transformers 10 and 24 with the load windings 16 and 18 of the saturable reactors 12 and 14.

The center-taps of the input and output transformers 10 and 24 are directly connected by a conductor 26. The load, such as indicated at 28, is coupled across the secondary winding of the output transformer 24. It will be seen that current always flows in one direction in the conductor 26 regardless of which of the load windings 16 and 18 is conducting.

Each of the saturable reactors 12 and 14 include respective control windings 30 and 32. These control windings are arranged to have an A.C. signal applied thereto, which may be accomplished as shown by connecting one of the ends of the control windings to taps on the secondary winding of the input transformer 10. The other ends of the control windings 30 and 32 are connected respectively through diodes 34 and 36 back to the center-tap of the input transformer 10 through a source (not shown) of D.C. control voltage $E_C$ in series with both control windings. The control voltage $E_C$ has a polarity as indicated such as to normally oppose the flow of current produced by the A.C. reference signal and passed by the diodes 34 and 36.

In operation it will be seen that the circuit of Fig. 1 produces an A.C. signal across the load, since the load windings 16 and 18 saturate and conduct on alternate half cycles of the input reference signals. The point in the conductive half cycle at which the respective load windings saturate is the same, and is determined by the magnitude of the control signal $E_C$, which in turn determines the level to which the flux is set in the saturable reactor cores during the respective non-conducting half cycles. Each of the saturable reactors operates on a self-saturating principle, in the same manner as the Ramey type magnetic amplifier, yet an A.C. output operation can be achieved without existence of any closed-loop circuits in which conductive currents can circulate. Thus the circuit is able to either turn on or turn off in a half cycle of operation.

The circuit of Fig. 1 produces an output A.C. signal having a fixed phase relationship with the reference voltage. Only the amplitude is controlled by the control signal, which control signal is always of one polarity. If it is desired to provide an A.C. output which is reversible in phase as well as variable in amplitude in response to a control signal which is reversible in polarity, the circuit of Fig. 2 may be used. The circuit of Fig. 2 is nothing more than two magnetic amplifiers of the type shown in Fig. 1 coupled to a common load and arranged to produce a reversible phase A.C. signal across the load phase. The circuit of Fig. 2 includes the further modification of using autotransformers in the input and the output.

In detail, the circuit of Fig. 2 includes an input autotransformer 40 to which is applied an A.C. reference voltage. A pair of saturable reactors 42 and 44 are respectively connected to opposite ends of the autotransformer 40 in the same manner as the saturable reactors of Fig. 1. The load winding 46 of the saturable reactor 42 is connected in series with a diode 50 to one end of an output autotransformer 54. Similarly the load winding 48 of the saturable reactor 44 is connected through a diode 52 to the other end of the output autotransformer 54.

The control windings 60 and 62 of the saturable reactors 42 and 44 are connected to taps adjacent opposite ends of the autotransformer 40 and are connected back to the center-tap through diodes 64 and 66 and through a control voltage source $EC_1$. As thus far described, with the exception of using autotransformers, the circuit is identical to that described in connection with Fig. 1 and the signal produced across the load is controlled in the identical manner, and there is a fixed phase relationship with the reference voltage.

To provide a signal of the opposite phase across the load, a second pair of saturable reactors are provided, as indicated at 70 and 72. These saturable reactors include load windings 74 and 76 respectively, which are connected to the ends of the input autotransformer 40. Diodes 80 and 82 connect the load windings 74 and 76 respectively to the ends of the output autotransformer 54. However, the series circuits comprising the load windings and diodes are arranged to connect opposite ends of the input and output transformers 40 and 54 with respect to the ends coupled by the series circuits formed by the load windings 46 and 48 and diodes 50 and 52. Thus conduction through the load windings of the saturable reactors 70 and 72 produces an A.C. signal across the load of opposite phase from the signal produced across the load by conduction of the saturable reactors 42 and 44.

The saturable reactors 70 and 72 are provided with control windings 90 and 92 which are connected to one end of the respective taps on the input autotransformer 40 in the same manner as the control windings 60 and 62 of the saturable reactors 42 and 44. Diodes 94 and 96 are respectively connected in series with the control windings 90 and 92 and the control voltage $EC_2$ is applied between the center-tap of the input transformer 40 and a common junction between the diodes 94 and 96.

It will be seen that with the control voltage $EC_1$ having one polarity and $EC_2$ having the opposite polarity relative to ground, only one pair of saturable reactors, such as reactors 42 and 44, are rendered conductive. As a result, an A.C. signal of one phase relationship with respect to the reference signal is provided across the load. If the polarities of the control voltages are reversed, then the other pair of saturable reactors, the reactors 70 and 72, are conductive and a signal across the load of opposite phase with relation to the input reference voltage is provided. In both phases, the magnitude of the voltage across the load is controlled by the magnitude of the control voltages. The control voltages $EC_1$ and $EC_2$ may be derived from a single control voltage source, such as the D.C. error voltage generally developed in a conventional closed loop servo system.

What is claimed is:

1. A fast response phase-reversing magnetic amplifier responsive to a D.C. input signal comprising an input transformer adapted to be coupled to a source of alternating current and having a center-tapped output, an output transformer adapted to be coupled to a load and having a center-tapped input, the center-taps of the input and output transformers being directly connected, a first saturable reactor having a load winding and a control winding, a first diode in series with the load winding, the diode and load winding being connected between one end of the input transformer and one end of the output transformer, a second saturable reactor having a load winding and a control winding, a second diode in series with the load winding, the second diode and load winding being connected between the other end of the input transformer and the other end of the output transformer, both diodes being connected to conduct current in the same direction between the input and output transformers, a third diode connected in series with the control winding of the first reactor, a fourth diode connected in series with the control winding of second reactor, the third diode and associated control winding and the fourth diode and associated control winding being respectively connected between a first common terminal and taps on either side of the center-tap of the input transformer, the third and fourth diodes being connected to conduct current in the opposite direction from the first and second diodes in relation to the input transformer, a third reactor having a load winding and a control winding, a fifth diode in series with the load winding, the fifth diode and load winding connecting said one end of the input transformer to said other end of the output transformer, a fourth reactor having a load winding and a control winding, a sixth diode in series with the load winding, the sixth diode and load winding connecting said other end of the input transformer to said one end of the output transformer, the fifth and sixth diodes being connected to conduct current in the same direction as the first and second diodes relative to the input transformer, a seventh diode connected in series with the control winding of the third reactor, and an eighth diode connected in series with the control winding of the fourth reactor, the seventh diode and associated control winding and the eighth diode and associated control winding being respectively connected between a second common terminal and said taps on either side of the center-tap of the input transformer, the seventh and eighth diodes being connected to conduct current in the opposite direction from the fifth and sixth diodes in relation to the input transformer, the input signal being applied between the first and second common terminals.

2. A fast response phase-reversing magnetic amplifier responsive to a D.C. input signal comprising an input transformer adapted to be coupled to a source of alternating current and having a center-tapped output, an output transformer adapted to be coupled to a load and having a center-tapped input, the center-taps of the input and output transformers being directly connected, a first saturable reactor having a load winding and a control winding, a first diode in series with the load winding, the diode and load winding being connected between one end of the input transformer and one end of the output transformer, a second saturable reactor having a load winding and a control winding, a second diode in series with the load winding, the second diode and load winding being connected between the other end of the input transformer and the other end of the output transformer, both diodes being connected to conduct current in the same direction between the input and output transformers, a third diode connected in series with the control winding of the first reactor, and a fourth diode connected in series with the control winding of the second reactor, the third diode and associated control winding and the fourth diode and associated control winding being respectively connected between a first common terminal and taps on either side of the center-tap of the input transformer, the third and fourth diodes being connected to conduct current in the opposite direction from the first and second diodes in relation to the input transformer.

3. A fast response magnetic amplifier for producing an alternating current output signal, the magnitude of which is varied in response to changes in magnitude of a direct current input control signal, said amplifier comprising a pair of saturable reactors each having a load winding and a control winding, diodes in series with each of the windings of the reactors for limiting current flow in one direction through each of the respective windings, means for providing a first center-tapped alternating reference voltage source, means for providing a center-tapped load, the center-taps of the source means and the load means being connected to a common return, the load windings with their series diodes connecting the load means to the source means, the respective diodes being arranged to conduct current in the same direction between the source and the load, whereby current flows from the source to the load alternately through the two saturable reactors on successive half cycles of the alternating reference voltage, means for providing a second center-tapped alternating reference voltage source, the center-tap being connected to the common return, the control windings of the saturable reactors with their series diodes being connected in series with each other across the second reference voltage source means, the diodes being connected to oppose the flow of current in either direction in this series path, and means for connecting the control voltage between the common return and the common series connection between each of the control windings with their associated diodes.

4. Apparatus for dividing a load from an alternating current source and varying the magnitude of the voltage across the load in response to a D.C. control signal, said apparatus comprising first and second saturable reactors each including a load winding and a control winding, diodes in series with each of the windings of said reactors, means providing a first conductive path between the source and the load including the load winding of the first saturable reactor with its series diode and a common return, means providing a second conductive path between the source and the load including the load winding of the second saturable reactor with its series diode and said common return, the diodes being arranged to alternately conduct current in the common return on successive half cycles of the source, means providing a third conductive path including the D.C. control signal source and the control winding of the first saturable reactor with its series diode, means for applying an alternating reference voltage in place with the alternating current source across said third conductive path, the diode in series with the control winding being arranged to normally conduct current on the half cycles of said source during which the diode associated with the load winding of the first saturable reactor blocks current, means providing a fourth conductive path including the D.C. control signal source and the control winding of the second saturable reactor with its series diode, and means for applying an alternating reference voltage in phase with the alternating current source across said fourth conductive path, the diode in series with the control winding of the second saturable reactor being arranged to normally conduct on the half cycles of said source during which the diode associated with the load winding of the second saturable reactor blocks current.

5. Apparatus for driving a load from an alternating current source and varying the magnitude of the voltage across the load in response to a D.C. control signal, said apparatus comprising first and second saturable reactors each including a load winding and a control winding, diodes in series with each of the windings of said reactors, phase-splitting means coupled to the alternating current source for providing first and second alternating reference voltage of opposite phase with respect to a common return, means providing a first conductive path between one output phase of the phase-splitting means and the load including the load winding of the first saturable reactor with its series diode and the common return, means providing a second conductive path between the other output phase of the phase-splitting means and the load including the load winding of the second saturable reactor with its series diode and said common return, the diodes being arranged to conduct current alternately in the common return on successive half cycles of the source, means providing a third conductive path including the D.C. control signal source and the control winding of the first saturable reactor with its series diode, means for applying an alternating reference voltage in phase with the alternating current source across said third conductive path, the diode in series with the control winding being arranged to normally conduct current on the half cycles of said source during which the diode associated with the load winding of the first saturable reactor blocks current, means providing a fourth conductive path including the D.C. control signal source and the control winding of the second saturable reactor with its series diode, and means for applying an alternating reference voltage in phase with the alternating current source across said fourth conductive path, the diode in series with the control winding of the second saturable reactor being arranged to normally conduct on the half cycles of said source during which the diode associated with the load winding of the second saturable reactor blocks current.

References Cited in the file of this patent

UNITED STATES PATENTS

| | | |
|---|---|---|
| 2,764,723 | Scorgie | Sept. 25, 1956 |
| 2,820,943 | Sanders | Jan. 21, 1958 |
| 2,827,603 | Fingerett et al. | Mar. 18, 1958 |

OTHER REFERENCES

Publication: "Fuel-Wave Reversible-Polarity Half-Cycle-Responsive Magnetic Amplifier," C. B. House, Naval Research Laboratory (NRL Report 4541), June 20, 1955.